(12) United States Patent
Chang (10) Patent No.: US 7,173,225 B2
(45) Date of Patent: Feb. 6, 2007

(54) INDUCTION HEATING PAN (75) Inventor: Myung Yeol Chang, Gwangju-si (KR)

(73) Assignee: Tiger Company Ltd., Gyeonggi-do (KR)

( * ) Notice: Subject to any disclaimer, the term of this patent is extended or adjusted under 35 U.S.C. 154(b) by 86 days.

(21) Appl. No.: 11/147,753

(22) Filed: Jun. 8, 2005

(65) Prior Publication Data
US 2005/0279225 A1 Dec. 22, 2005

(30) Foreign Application Priority Data
Jun. 16, 2004 (KR) .................. 10-2004-0044630

(51) Int. Cl.
H05B 6/12 (2006.01)
A27J 27/00 (2006.01)
(52) U.S. Cl. .................. 219/621; 219/438; 219/523; 219/524; 99/451; 99/DIG. 14; 220/836
(58) Field of Classification Search ........ 219/621–623, 219/438–439, 523–524; 99/451, DIG. 14; 220/810, 836
See application file for complete search history.

(56) References Cited

U.S. PATENT DOCUMENTS

| 4,617,452 A | * | 10/1986 | Miwa | 219/441 |
| 5,429,039 A | * | 7/1995 | Chang | 99/331 |
| 6,281,483 B2 | * | 8/2001 | Yagi et al. | 219/621 |

FOREIGN PATENT DOCUMENTS

KR 2005-037079 * 4/2005

* cited by examiner

Primary Examiner—Philip H. Leung
(74) Attorney, Agent, or Firm—Madson & Austin

(57) ABSTRACT

The present invention relates to an induction heating pan comprising a pan body having an inner pan and an outer pan, a lid and a hinge member to connect the lid to the pan body, wherein the hinge member comprises a hollow cylindrical part which contains various connecting elements therein to control the opening angles of the lid, so that the loss of the connecting elements can be prevented in separating the lid from the pan body and it becomes more convenient to clean the lid and the hinge member, and the lid can be lifted smoothly at predetermined angles and easily separated from the body.

3 Claims, 10 Drawing Sheets

INDUCTION HEATING PAN

BACKGROUND OF THE INVENTION

The present invention relates to an induction heating pan, and more particularly to an induction heating pan comprising a pan body having an inner pan and an outer pan, a lid and a hinge member to connect the lid to the pan body, wherein the hinge member comprises a hollow cylindrical part which contains various connecting elements therein to control the opening angles of the lid, so that the loss of the connecting elements can be prevented in separating the lid from the pan body and it becomes more convenient to clean the lid and the hinge member, and the lid can be lifted smoothly at predetermined angles and easily separated from the body.

Generally, in a buffet restaurant or in other restaurants where people serve themselves from various dishes displayed on a table or sideboard, various foods are contained in induction heating pans or chafing dishes so that people can take the foods according to their tastes.

If such induction heating pans or chafing dishes contain foods which need to be maintained warm or hot, they are usually heated by heating means such as burners or electric heating devices. Specifically, the induction-heating pan usually comprises an inner pan or pot and an outer pan or pot, and includes a lid. In order to keep the food in the inner pan warm or hot, the outer pan is heated by the heating means and only when the food is taken or replenished, the lid is open completely. Otherwise, the lid is to be closed.

The inventor of the present invention disclosed a device for adjusting opening angles of a cover for chafing dishes in Korean Utility Model Laid-Open Publication No. 2001-000379. Also, by improving the structure of the above adjusting device, the inventor developed a new induction-heating pan as disclosed in Korean Patent Application No. 10-2003-0072492.

In the heating pan disclosed in the above patent application, a hinge was provided on a hinge mounting flange formed on a rear side of a pan body, to connect a lid with the pan body. The hinge comprised a connecting bracket, both ends of which were connected with a pair of hinge maintaining frames spaced apart from each other on a surface of the hinge mounting flange. The connecting bracket included a hinge damper therein so that a lid of the induction-heating pan could rotate smoothly to be open and shut. Further, the hinge damper was provided with a hinge cap, which was elastically guided to the hinge maintaining frames by means of a ball, so that opening angels of the lid could be restrictively controlled.

Further, a supporting stand was provided downwardly beneath the hinge mounting flange on the rear side of the pan body, and it was of a predetermined dimension such that a lower end of the stand could be in contact with a table. Therefore, when the lid was lifted at an angle of 90° with respect to the pan body, the supporting stand could prevent the overturn or shaking of the pan body despite of the rearward movement of the center of gravity.

Also, since a steam valve was provided at the center of the lid, when overpressure was generated inside of the pan in boiling the food therein, an appropriate amount of steam could be exhausted through the steam valve, so that the pan could be used safely and a safety accident could be prevented.

However, since the connecting bracket was mounted detachably between the hinge maintaining frames formed on the hinge mounting flange of the pan body and it was supported elastically by means of a spring support, a coil spring and a ball, when the lid connected with the connecting bracket was detached from the pan body for washing, such elements of the spring support, the coil spring and the ball could be lost.

Further, since recesses were formed to receive the spring support, the coil spring and the ball therein and grooves were also provided in the connecting bracket to receive the hinge damper and the cap therein, when the pan had to be washed, it was difficult to remove foreign substances and dirt from the recesses and grooves.

Furthermore, as the supporting stand was formed to have a constant height, when the pan was placed on an uneven surface, it could move unstably.

Meanwhile, when such a conventional heating pan was used, a spoon or spatula was usually put in the pan or in a dish separately provided outside of the pan. However, in the former case, since the spoon or spatula could be immersed in the food contained in the pan after serving, there could be a sanitary problem. Also, in the latter case, as the dish was provided separately from the pan, it was not preferable for sanitary reasons.

SUMMARY OF THE INVENTION

An object of the present invention is therefore to solve the above disadvantages of the conventional induction-heating pans, by providing an improved induction-heating pan comprising an inner pan, an outer pan, a lid and a hinge member.

Specifically, the present invention provides an induction-heating pan with the hinge member having a hollow cylindrical part containing various connecting elements therein, to prevent the loss of the connecting elements in separating the lid from a pan body and to facilitate the assembly and disassembly of the hinge member with the pan body.

Another object of the present invention is to provide an induction-heating pan, in which various connecting elements are contained in the hinge member with no recesses and grooves, enabling users to clean conveniently the lid and the pan body, respectively, without concern for removing foreign substances and dirt from the recesses and grooves.

A further object of the present invention is to provide an induction-heating pan with a spoon case separately connected to the pan body, so that the spoon or spatula cannot be immersed in the food contained in the pan after serving and there can be no concern for sanitary problems.

In order to achieve the above objects, an induction-heating pan according to the present invention comprises a pan body including an inner pan and an outer pan, a lid and a hinge member to connect the lid with the pan body, wherein the hinge member comprises a pair of hinge maintaining frames mounted on an extended flange formed by extending a rear part of the outer pan, to be opposite to each other; and a connecting bracket containing in its hollow cylindrical part an opposing pair of hinge fixing caps, ball guiding caps, and hinge dampers having damper shafts in sequence, wherein each of the hinge maintaining frames includes a vertical recess on its inner side to be fitted to each of the hinge fixing caps, which are connected to the damper shafts of the hinge dampers, so that the connecting bracket can be fitted to and released from the hinge maintaining frames.

Further, according to the present invention, a spoon case is detachably connected to the outer pan of the pan body.

In addition, a lifting rod may be provided on a flange of the outer pan to lift the inner pan.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, wherein.

DETAILED DESCRIPTION OF THE PREFERRED EMBODIMENTS

The preferred embodiments of the present invention will be described in detail with reference to the accompanying drawings.

Figure 1:
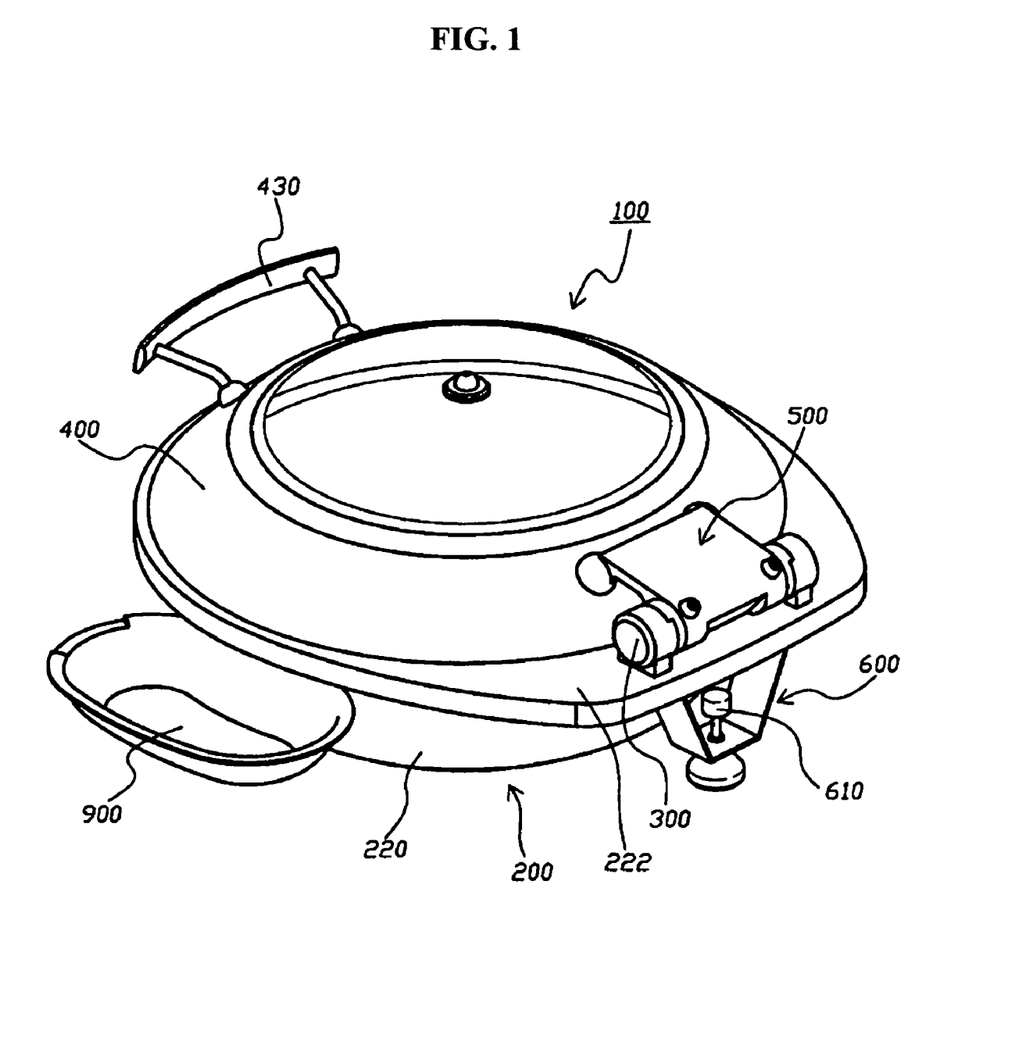
FIG. 1 is a perspective view of an induction-heating pan according to the present invention where the pan is covered with a lid.
Figure 2:
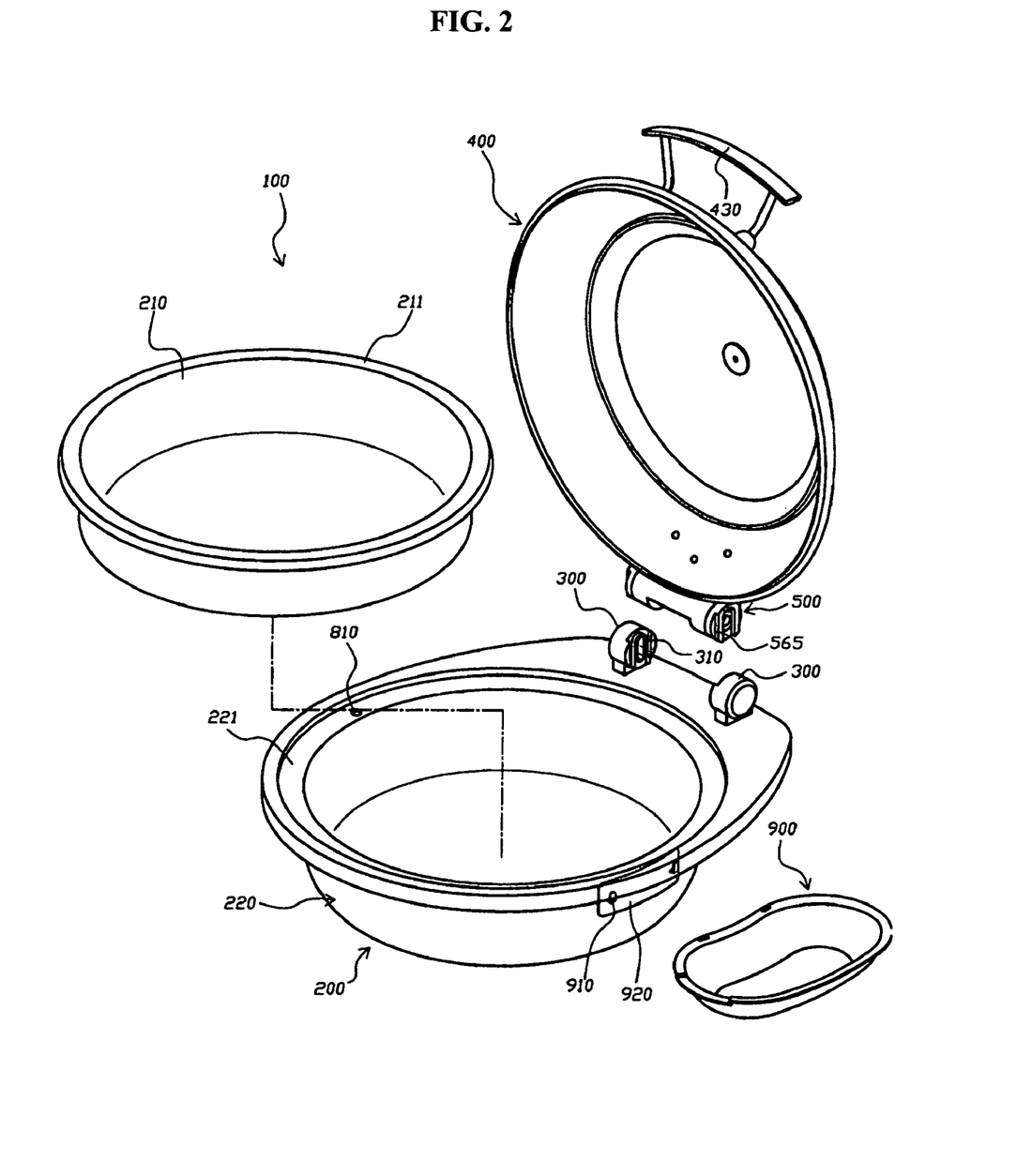
FIG. 2 is an exploded perspective view of the induction-heating pan according to the present invention where the lid is lifted open.

Referring to FIGS. 1 and 2, an induction-heating pan (100) according to the present invention comprises a pan body (200) including an inner pan (210) and an outer pan (220), a lid (400) and a hinge member to connect the lid (400) with the pan body (200).

Food is placed in the inner pan (210), where the food is boiled or kept warm by a heating means.

The outer pan (220) has a dimension to receive the inner pan (210) therein.

A flange (211) of the inner pan (210) is put on a flange (221) of the outer pan (220).

The outer pan (220) may have dual or triple bottom surface (not shown) so that the heat generated by a heating means such as a burner or an electric heating device can be conducted efficiently to the inner pan (210).

The flange (221) of the outer pan (220) is extended to form an extended flange (222) substantially in the shape of a trapezoid.

On the surface of the extended flange (222), a pair of opposing hinge maintaining frames (300) are mounted by using fixing means such as screws (not shown), and they are spaced apart from each other to receive a connecting bracket (500) therebetween.

The hinge member comprises a pair of the hinge maintaining frames (300) and the connecting bracket (500).

The connecting bracket (500) has a hollow cylindrical part to contain an opposing pair of hinge fixing caps (560), ball guiding caps (540), and hinge dampers (520) having damper shafts (521) in sequence therein.

Figure 5:
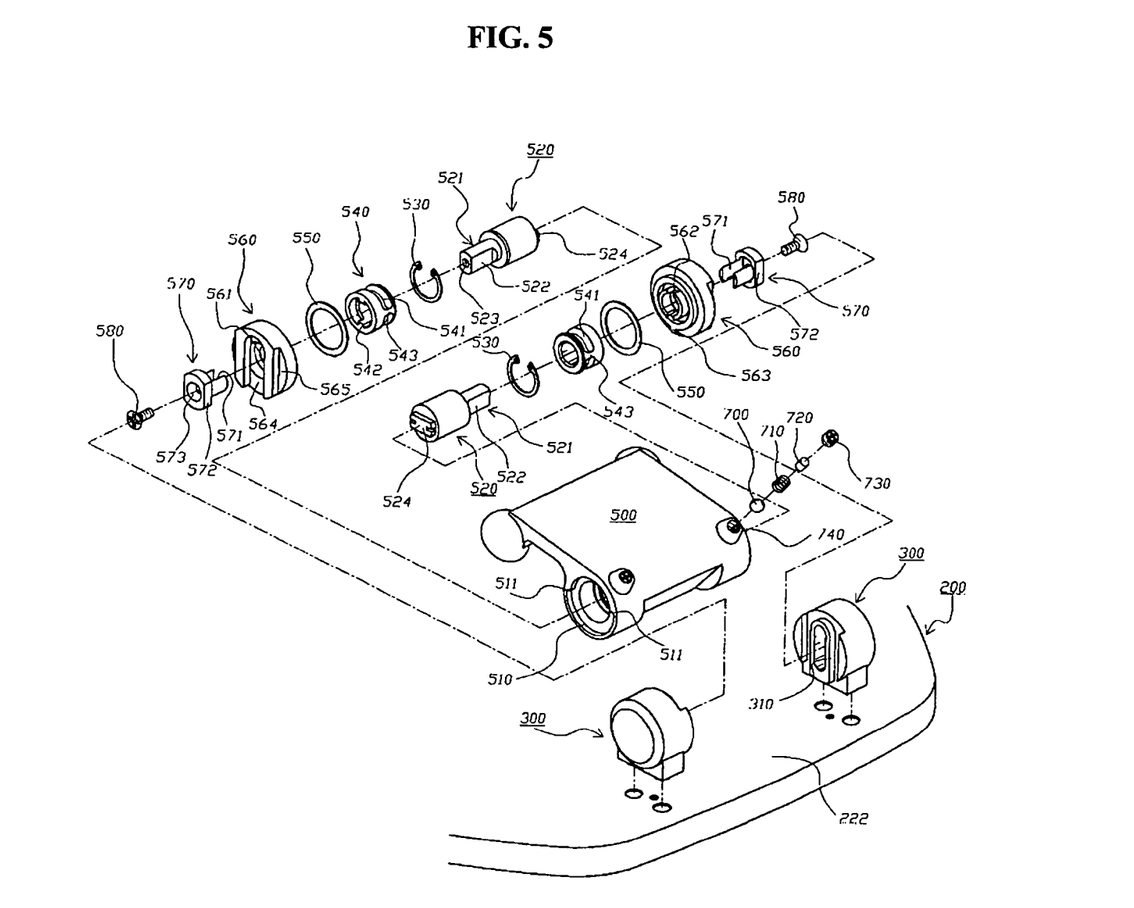
FIG. 5 is an exploded perspective view showing connecting parts of a hinge member of the induction-heating pan according to the present invention.
Figure 6:
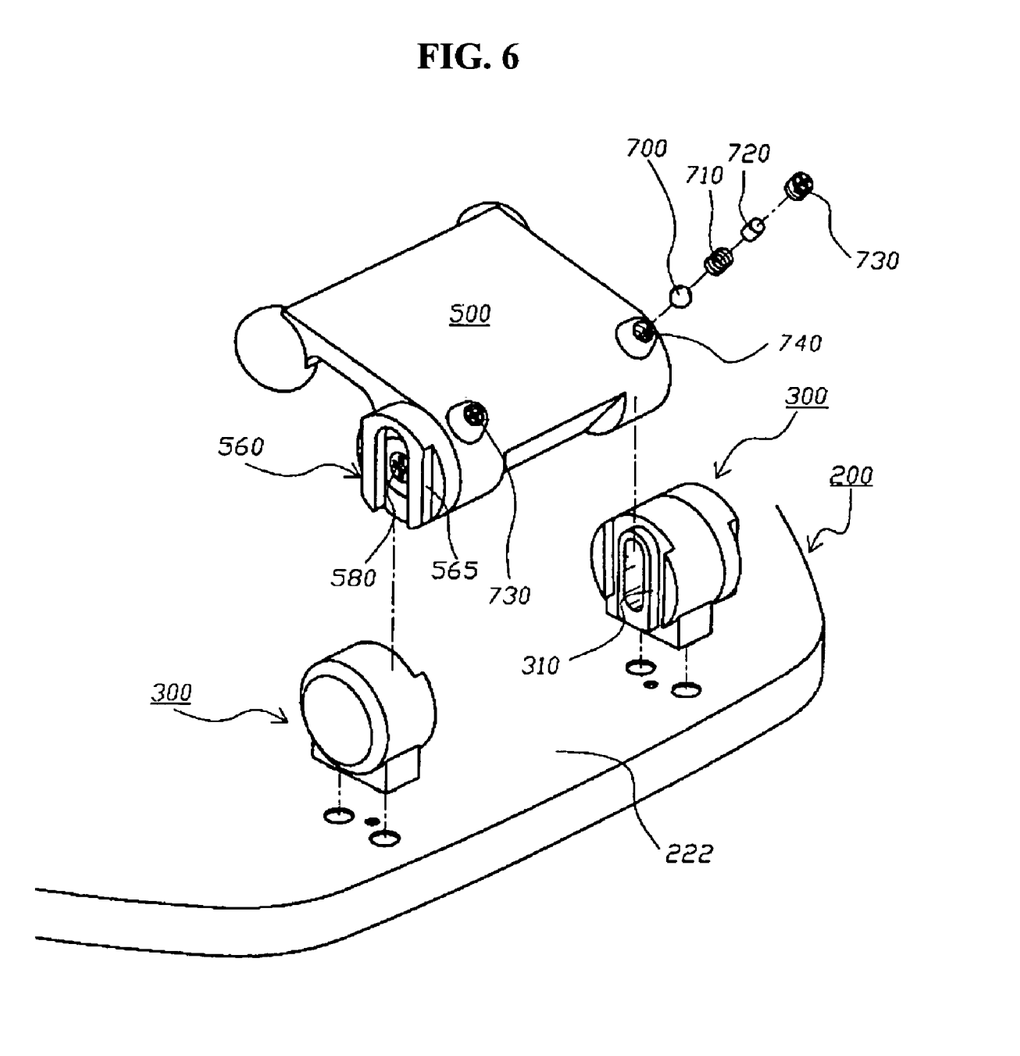
FIG. 6 is a partial exploded perspective view showing a connecting bracket of the hinge member detached from hinge maintaining frames formed on the pan body.

As shown in FIGS. 5 and 6, each of the hinge maintaining frames (300) includes a vertical recess (310) on its inner side to be connected with each of the hinge fixing caps (560) in the connecting bracket (500). The vertical recess (310) has a dimension to fit to a vertical jaw (565) formed on an external side of the fixing cap (560).

The lid (400) is provided with a handle (430) attached thereto.

As shown in FIG. 1, FIG. 2 FIG. 8a and FIG. 8b, the connecting bracket (500) is mounted on a rear side of the lid (400) by fixing means such as screws.

The connecting bracket (500) is shaped in a substantially rectangular shape and has a hollow cylindrical part formed on a rear end thereof.

As shown in FIG. 5, FIG. 6, FIG. 7a and FIG. 7b, in the hollow cylindrical part, an opposing pair of the hinge dampers (520) having damper shafts (521), snap rings (530), ball guiding caps (540), space rings (550), hinge fixing caps (560), damper fixing caps (570) and screws (580) are assembled in sequence, and they are provided symmetrically.

Figure 7A:
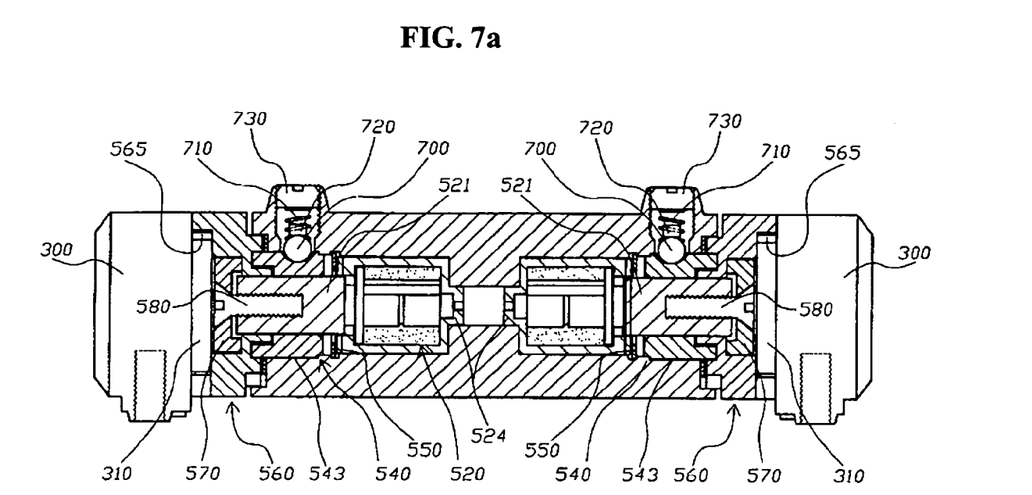
FIG. 7a and FIG. 7b are cross sectional views of the connecting bracket fitted to the hinge maintaining frames according to the present invention.
Figure 7B:
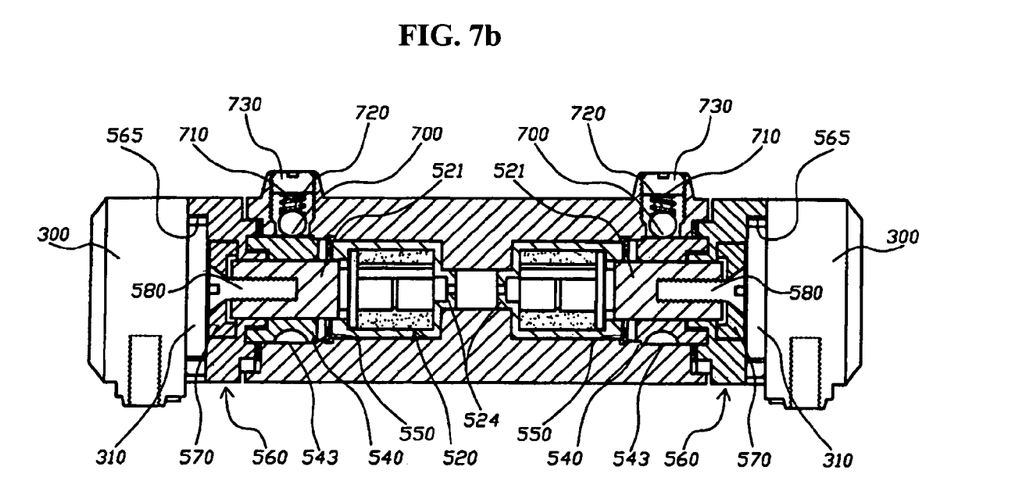

Further, ball through holes (740) are formed on an external surface of the connecting bracket (500). In each of the ball through holes (740), a ball (700), a spring (710), a spring maintaining rod (720) and a screw (730) are provided, and the ball (700) is maintained in the hole (740) so that it is elastically supported in the ball guiding cap (540), as shown in FIG. 7a and FIG. 7b.

With the above structure, the connecting bracket (500) having one end fixed to the lid (400) can be assembled and disassembled with the hinge maintaining frames (300) at the other end thereof.

The sequential assembly of the hinge dampers (520), the snap rings (530), the ball guiding caps (540), the space rings (550), the hinge fixing caps (560), the damper fixing caps (570) and the screws (580) in the connecting bracket (500) will be described in detail hereinafter.

Firstly, fixing jaws (524) formed on opposing sides of the hinge dampers (520) are fitted together. Then, the snap rings (530) are assembled so that the hinge dampers (520) cannot move.

The hinge dampers (520) are provided with the damper shafts (521) protruded on the other side of the fixing jaws (524).

The damper shaft (521) has both bluff sides (522) to be connected with the ball guiding cap (540), the space ring (550), the hinge fixing cap (560) and the damper fixing cap (570) in sequence, and it is connected with the screw (580) at its end, so that the hinge damper (520) can rotate with the connecting bracket (500) in lifting up and putting down the lid (400).

The hinge damper (520) may be operated in various modes such as oil damper, gas damper or spring damper.

The ball guiding cap (540) is a cylindrical body. It has two arc-shaped grooves (541) along its external periphery, which are divided by two jaws (543), so that the ball (700) can slidably move in the arc-shaped grooves (541) as shown in FIGS. 7a and 7b.

Further, the ball guiding cap (540) has protrusions (542) formed at its internal surface end to be opposite to each other, so that the protrusions (542) can be fitted to grooves (562) formed along an internal circumference of the hinge fixing cap (560) on its inner side and the ball guiding cap (540) can be coupled with the hinge fixing cap (560).

The space ring (550) is provided between the ball guiding cap (540) and the hinge fixing cap (560).

As shown in FIG. 5, the hinge fixing cap (560) is a cylindrical body and has the two opposing grooves (562) along its internal circumference on the inner side thereof, to be coupled with the protrusions (542) of the ball guiding cap (540).

Further, the hinge fixing cap (560) is provided with a protruding jaw (563) on an outer periphery of the grooves (562). The protruding jaw (563) is guided in an arc-shaped groove surface (510), which is formed along an external circumference of the hollow cylindrical part of the connecting bracket (500), so that the connecting bracket (500) can be rotatably maintained with the hinge fixing cap (560).

In this connection, restriction jaws (511) are provided at both ends of the arc-shaped groove surface (510) to restrict the rotation of the connecting bracket (500). Such restriction of the rotation range of the connecting bracket (500) results in the restriction of opening angles of the lid (400) with respect to the outer pan (220).

On the other side of the hinge fixing cap (560), a vertical groove (564) is provided to receive the damper fixing cap (570) therein, so that the damper fixing cap (570) is fixed in the vertical groove (564). Further, the vertical jaw (565) is provided outside of the vertical groove (564) to be fitted to the vertical recess (310) formed on an inner side of the hinge maintaining frame (300).

The damper fixing cap (570) has a pair of wings (571) on an inner side thereof, bluff side surfaces (572), and a hole (573) in the center thereof. The wings (571) pass through the hinge fixing cap (560) to be fitted to the bluff sides (522) of the damper shaft (521) of the hinge damper (520), so that the damper shaft (521) can be fixed in the hinge fixing cap (560). The bluff side surfaces (572) of the damper fixing cap (570) is fitted into the vertical groove (564) of the hinge fixing cap (560).

Threads of the screw (580) pass through the hole (573) of the damper fixing cap (570) to be engaged with a screw hole (523) formed in the center of the damper shaft (521) of the hinge damper (520), so that the ball guiding cap (540), the hinge fixing cap (560), and the damper fixing cap (570) can be combined together and fixed.

Therefore, as shown in FIG. 5, an opposing pair of the hinge dampers (520), the snap rings (530), the ball guiding caps (540), the space rings (550), the hinge fixing caps (560) and the damper fixing caps (570) are contained in the connecting bracket (500) in sequence.

As shown in FIG. 2 and FIG. 6, the connecting bracket (500) is connected to the hinge maintaining frames (300) by fitting the vertical jaws (565) of the hinge fixing caps (560) into the vertical recesses (310) formed on respective inner sides of the hinge maintaining frames (300).

Figure 3:
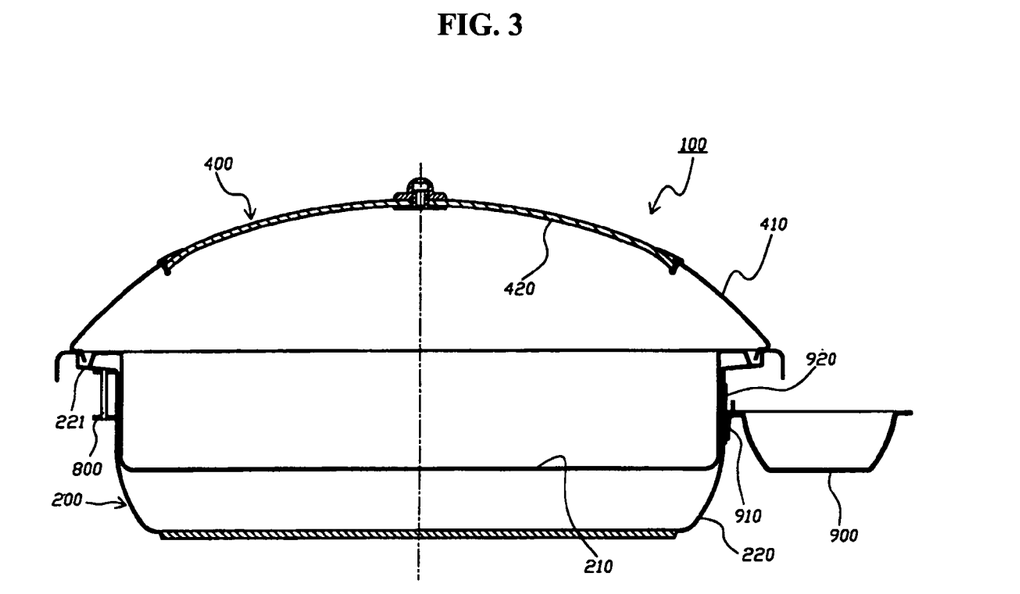
FIG. 3 is a cross sectional view of the induction-heating pan according to the present invention.
Figure 4:
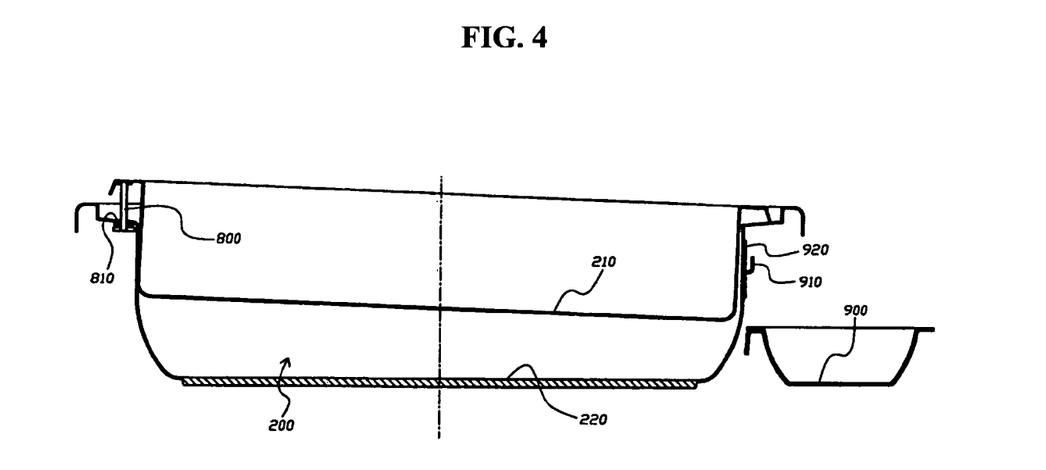
FIG. 4 is a cross sectional view of the induction-heating pan with the lid omitted, where a spoon case is detached from the pan and one end of an inner pan is lifted up to be separated from a pan body.

In the meantime, as shown in FIGS. 2, 3 and 4, a spoon case (900) may be provided separately to one side of the outer pan (220) and detachably connected to the pan body (200). A mounting bracket (920) is fixed on one side surface of the outer pan (220) by welding by fixing means, and the spoon case (900) may be attached to the outer pan (220) by hanging on hooks (910) formed on the mounting bracket (920).

Further, as shown in FIG. 2 to FIG. 4, a lifting rod (800) in a substantially "I" shape may be provided on the flange (221) of the outer pan (220). An opening (810) is formed on the flange (221) of the outer pan (220), and by pushing up the rod (800) through the opening (810), the flange (211) of the inner pan (210) is lifted up, so that a space can be secured for a user to take out and separate the inner pan (210) from the outer pan (220). It provides convenience and easiness in using the pan (100) of the present invention.

Figure 8A:
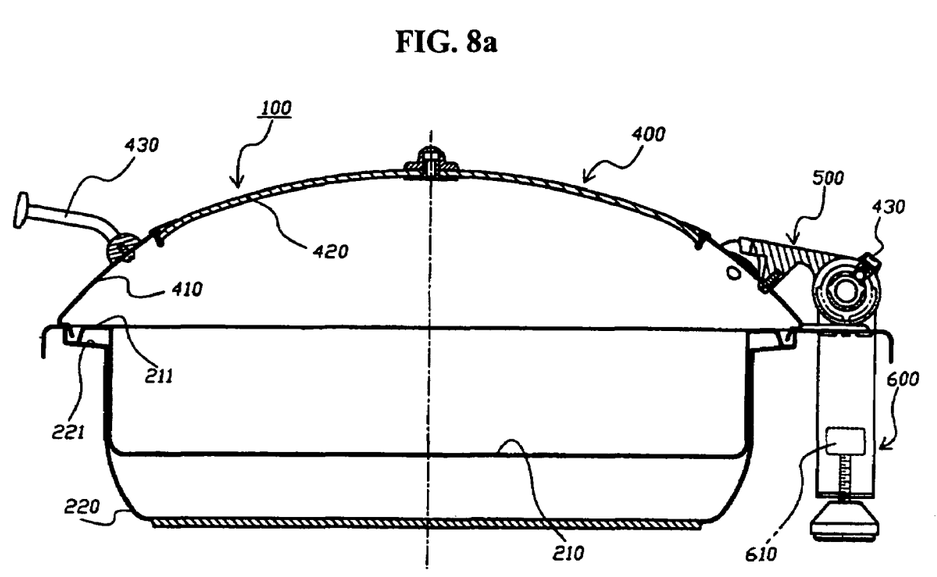
FIG. 8a and FIG. 8b are cross sectional views showing the states where the lid is put on the pan body and it is lifted up, respectively.
Figure 8B:
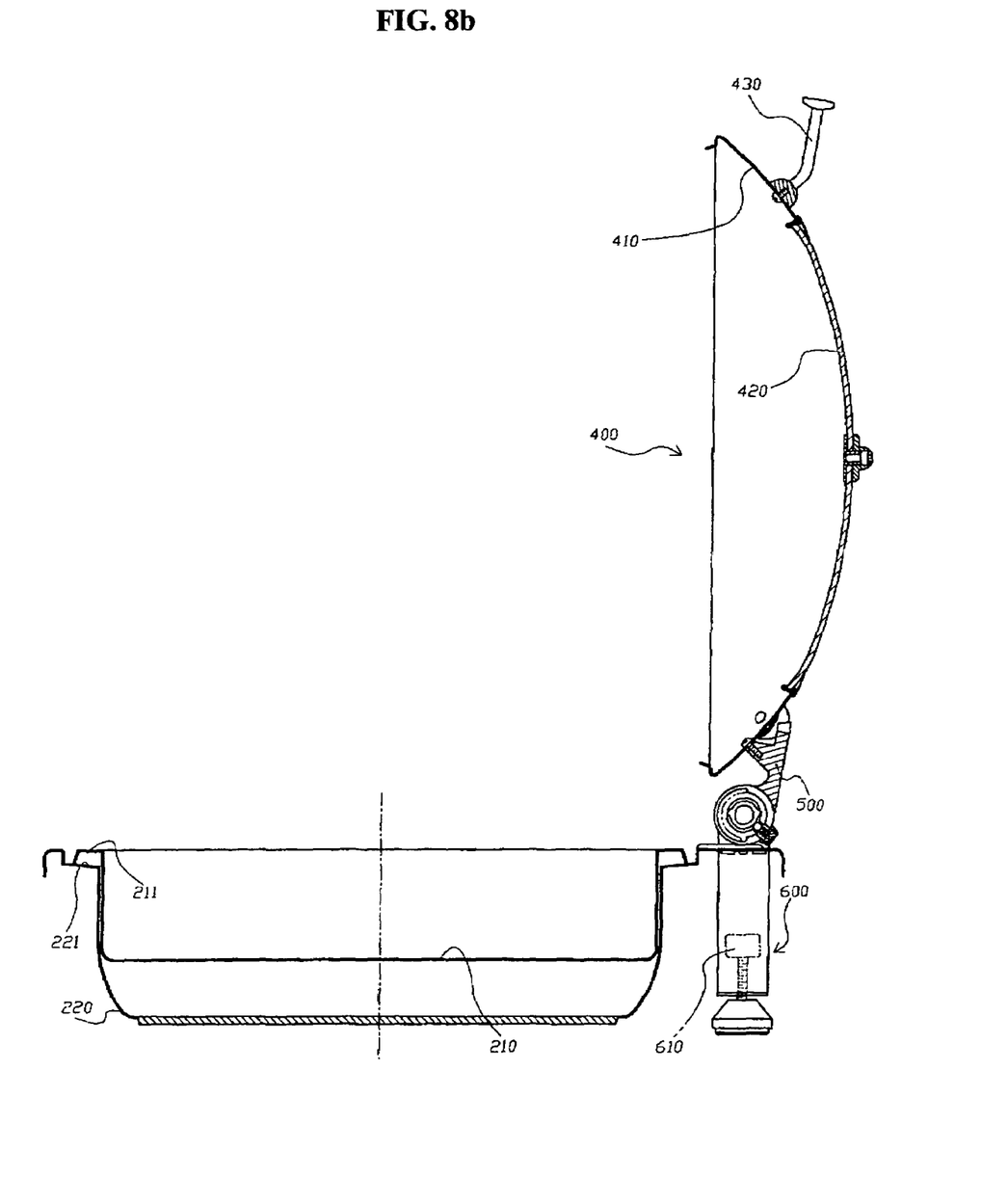

Further, a supporting stand (600) is provided beneath the extended flange (222) of the outer pan (220) and an adjusting screw (610) is provided through the supporting stand (600). As shown in FIG. 1 and FIGS. 8a and 8b, the adjusting screw (610) moves vertically by rotation, until the pan (100) is stably placed and fixed in a desired height on a table or any other place.

Figure 9A:
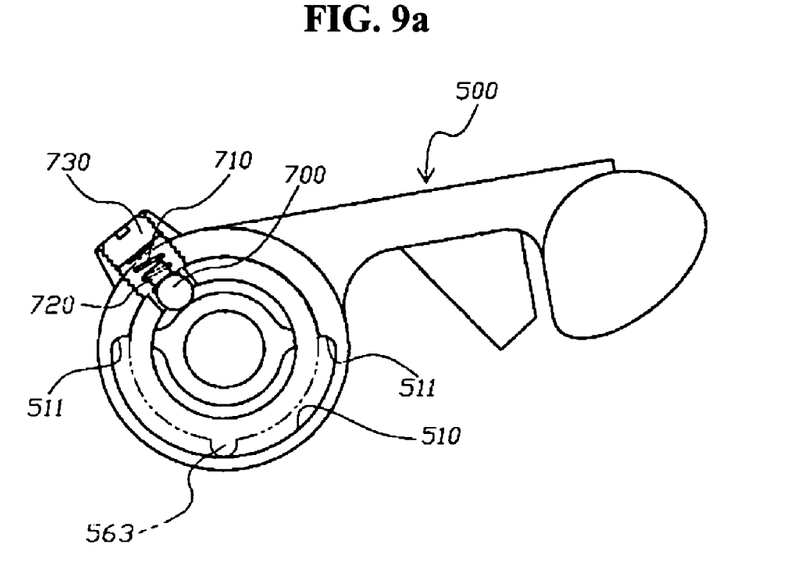
FIG. 9a, FIG. 9b and FIG. 9c are sectional views showing the connecting bracket when the lid is lifted up at an angle of 0°, 60° and 90° respectively.
Figure 9B:
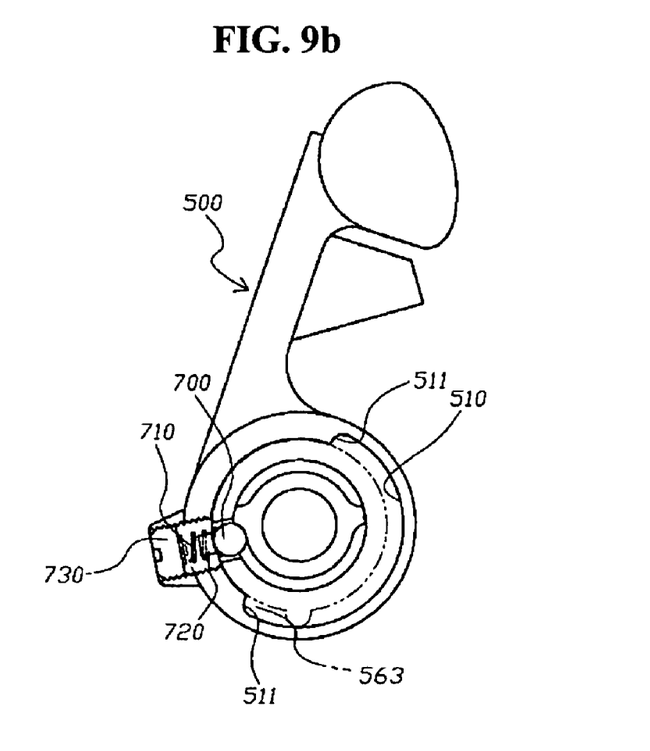

FIG. 9a shows the connecting bracket (500) when the pan (100) is covered with the lid (400). If the lid (400) is lifted up by rotating the connecting bracket (500) by 60° as in FIG. 9b, the ball (700) in the state of FIG. 7a becomes elastically supported by the jaw (543) of the ball guiding cap (540) as in FIG. 7b. Further, the arc-shaped groove surface (510) of the connecting bracket (500) is guided by the protruding jaw (563) of the hinge fixing cap (560), so that the connecting bracket (500) can maintain the 60° open position. Then, the lid (400) is maintained in a state that it is lifted up at the angle of 60° with respect to the outer pan (220).

Figure 9C:
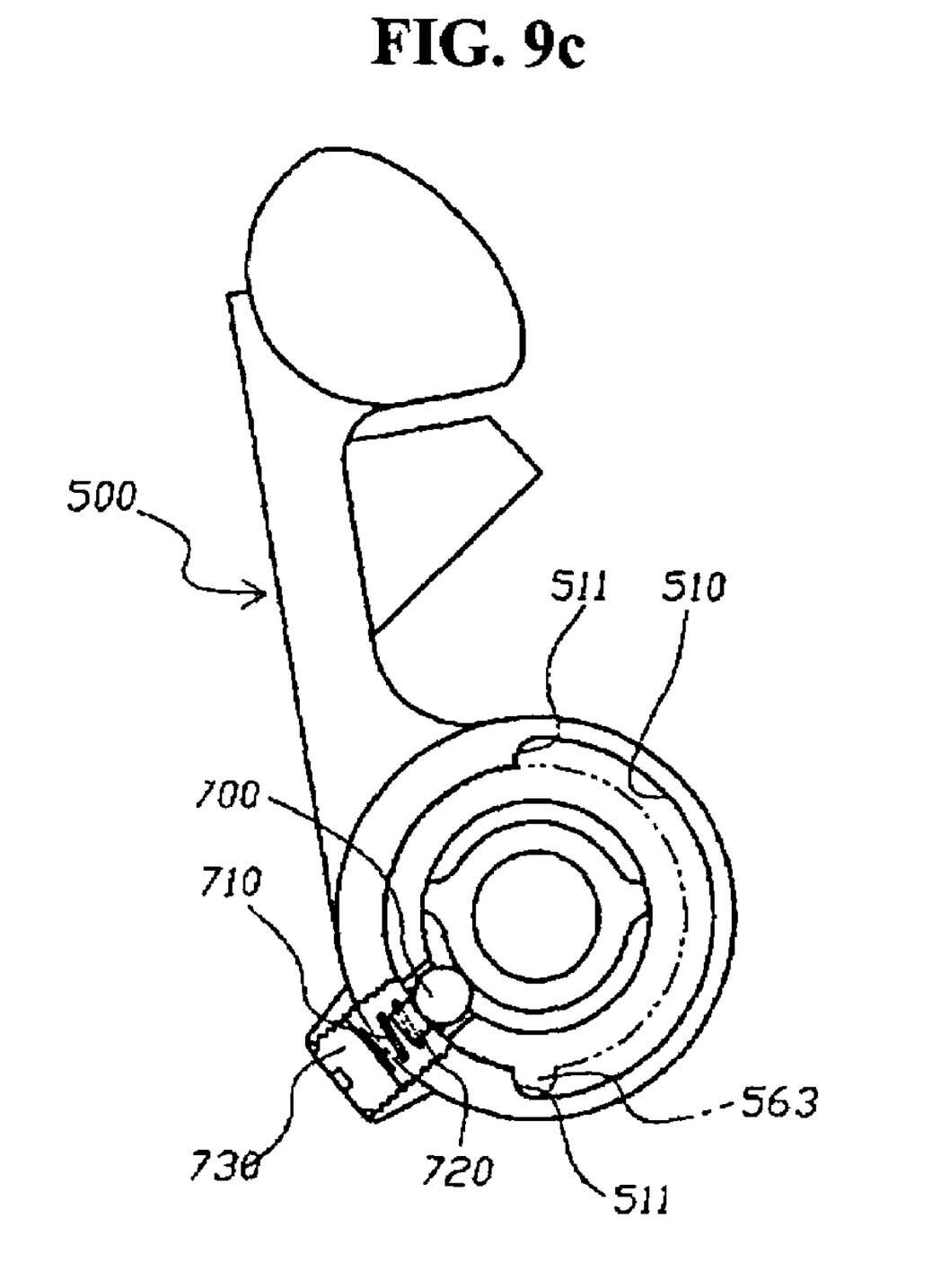

If the lid (400) is further lifted up from the pan body (200), the ball (700) slides elastically into the arc-shaped groove (541) of the ball guiding cap (540) as shown in FIG. 7a. Further, the arc-shaped groove surface (510) of the connecting bracket (500) is guided by rotation by the protruding jaw (563) of the hinge fixing cap (560), so that the connecting bracket (500) can maintain the 90° open position as shown in FIG. 9c. Consequently, the lid (400) is maintained in a state that it is lifted up at the angle of 90° with respect to the outer pan (220) as shown in FIG. 8b.

On the contrary, if the lid (400) is to be put down, the above procedures may be taken reverse. Of course, the user may close the lid (400) directly without the intermediate 60° open position from the pan body (200).

Further, according to the present invention, as shown in FIGS. 3, 8a and 8b, the lid (400) may comprise an opaque part (410) such as metal part and a transparent part (420) such as glass part, through which users can see the inside of the pan (100).

As described above, the induction-heating pan according to the present invention is provided with a hinge member having a hollow cylindrical part containing various connecting elements therein, thus preventing the loss of the connecting elements in separating a lid from a pan body and facilitating the assembly and disassembly of the hinge member with the pan body.

Further, the induction-heating pan according to the present invention has the hinge member containing various connecting elements therein, with no recesses and grooves, thus enabling users to clean conveniently the lid and the pan body, respectively, without concern for removing foreign substances and dirt from the recesses and grooves.

Furthermore, according to the present invention, an improved induction-heating pan is provided with a spoon case separately connected to the pan body, so that the spoon or spatula cannot be immersed in the food contained in the pan after serving and there can be no concern for sanitary problems.

Although the present invention has been described in connection with the preferred embodiments, it will be apparent to those skilled in the art that various changes and modifications can be made thereto without departing from the scope and spirit of the present invention. Therefore, the embodiments should be considered as not restrictive but illustrative. Further, the true scope of the present invention is defined by the appended claims, and changes and modifications should be constructed as falling within the scope of the present invention.

What is claimed is:

1. An induction-heating pan comprising a pan body including an inner pan and an outer pan, a lid and a hinge member to connect the lid with the pan body, wherein the hinge member comprises a pair of hinge maintaining frames mounted on an extended flange formed by extending a rear part of the outer pan, to be opposite to each other; and a connecting bracket containing in a hollow cylindrical part thereof an opposing pair of hinge fixing caps, ball guiding caps, and hinge dampers having damper shafts in sequence, and wherein each of the hinge maintaining frames includes a vertical recess on an inner side thereof fitted to each of the hinge fixing caps, which are connected to the damper shafts of the hinge dampers, so that the connecting bracket can be fitted to and released from the hinge maintaining frames.

2. An induction-heating pan as claimed in claim 1, wherein a spoon case is detachably connected to the outer pan of the pan body.

3. An induction-heating pan as claimed in claim 1, wherein a lifting rod is provided on a flange of the outer pan to lift the inner pan.

* * * * *